UNITED STATES PATENT OFFICE.

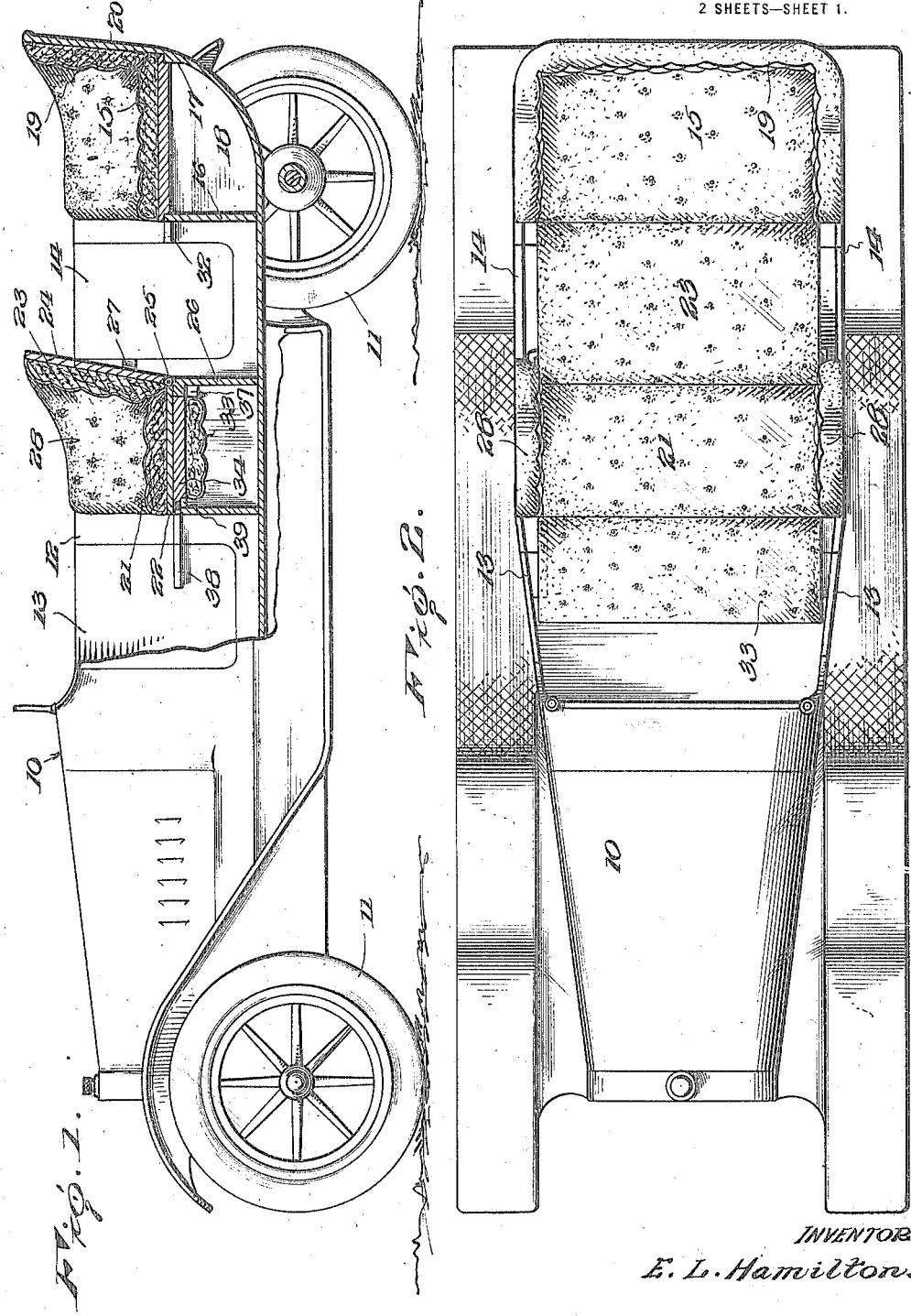

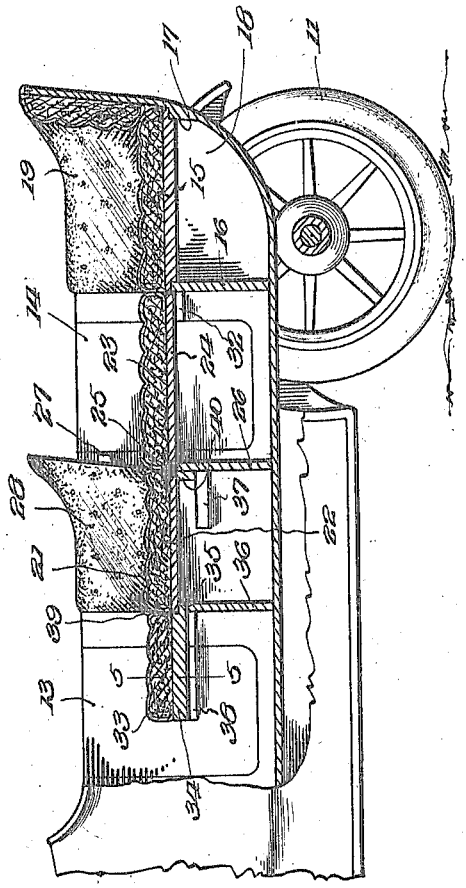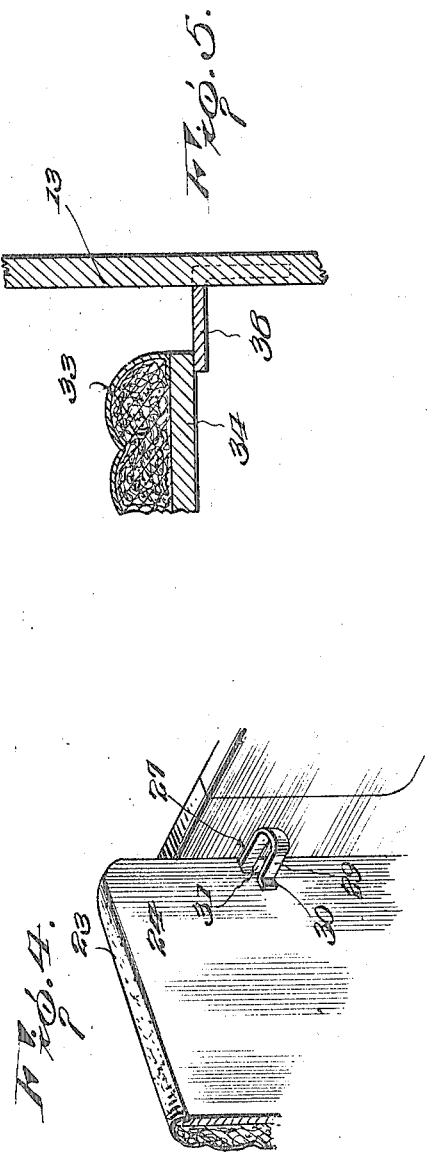

EDWARD L. HAMILTON, OF McCRORY, ARKANSAS.

CONVERTIBLE VEHICLE-BODY.

1,393,440.  Specification of Letters Patent.  Patented Oct. 11, 1921.

Application filed October 31, 1919. Serial No. 334,836.

*To all whom it may concern:*

Be it known that I, EDWARD L. HAMILTON, a citizen of the United States, residing at McCrory, in the county of Woodruff and State of Arkansas, have invented certain new and useful Improvements in Convertible Vehicle-Bodies, of which the following is a specification.

This invention relates to improvements in motor vehicles and more particularly to the body construction thereof.

An important object of this invention is to provide a vehicle body having novel means whereby the front and rear seats of the same may be conveniently converted into a sleeping bunk when desired.

A further object of this invention is to provide a vehicle body having novel means whereby the back of the front seat may be retained in an elevated or upright position when the bed is not in use.

A further object of this invention is to provide a car body having novel means for supporting an additional or auxiliary section which provides the necessary area when it is desired to convert the front and rear seats into a bed.

A further object of this invention is to provide a car body of the class described which is of highly simplified construction, desirable in use and comparatively cheap to manufacture.

Other objects and advantages of the invention will be apparent during the course of the following description.

In the accompanying drawings forming a part of this application and in which like numerals are employed to designate like parts throughout the same, Figure 1 is a side elevation of a vehicle embodying the invention, parts thereof being shown in section;

Fig. 2 is a plan view of the same;

Fig. 3 is a fragmentary central vertical section through the body, the front and rear seats being shown positioned for use as a bed;

Fig. 4 is a fragmentary perspective of the body illustrating the means for detachably securing the front seat in an elevated or upright position;

Fig. 5 is a vertical transverse section taken on line 5—5 of Fig. 3.

In the drawings wherein for the purpose of illustration is shown a preferred embodiment of the invention, the numeral 10 generally designates a vehicle body which in this case is of the touring car type and is mounted on wheels 11. The body 10 is provided with longitudinal sides 12 to which are hinged front and rear doors 13 and 14 respectively. As is usual in touring cars, a rear seat or cushion 15 is mounted on a vertical partition 16 and a transversely extending bracket 17. The partition 16, the cushion 15 and the adjacent portion of the body provide a compartment 18 which is adapted to receive bedclothing when the seats are not arranged in bed formation. The rear cushion 15 may be readily detached for affording access to the bedclothing or other contents of the rear compartment 18. A vertical cushion 19 is secured to the back 20 and the rear end portion of the longitudinal sides 12.

As illustrated in Figs. 1 and 3, the body is provided between the doors 13 and 14 with a front seat or cushion 21 which is provided with a base 22. The front seat 21 is removably arranged in position and has its rear longitudinal edge extending parallel to the lower longitudinal edge of a back 23. The back 23 is provided with a base 24 horizontally hinged as at 25 to a transversely extending partition or upright 26. The back 23 is detachably held in an upright or substantially vertical position by leaf springs 27. The leaf springs 27 have their forward end portions secured to the sides 12 inwardly of the vertical cushions 28 of the front seat 21. The rear portions of the leaf springs 27 are bent into U-shaped formation to provide spring arms 29 which as illustrated in Fig. 4 have their terminal portions 30 bent at right angles and in engagement with the base 24 of the back 23. The rear end portions of the springs 27 are extended through recesses 31 in the vertical edge portions of the base 24. As is obvious from Fig. 4, the back 23 may be readily swung from a horizontal to an elevated position and the inner arm 29 will be pressed inwardly upon being engaged by the base 24. When the base 24 has been swung to an elevated position, the laterally projecting end portion 30 of the spring will engage the rear side of the base and therefore securely retain the same in an upright position. When it is desired to arrange the back 23 horizontally, the spring arms 29 may be pressed outwardly simultaneously to permit of the downward pivotal movement of the back. The specific means employed for detachably retaining the back in an elevated position are simple to operate and do not detract appreciably from the appearance of the vehicle. When the back of the front seat is swung to a horizontal position, the same is engaged with a pair of horizontal brackets 32 secured along the inner sides 12 of the body. As illustrated in Fig. 3, the upper edge of the base 24 is positioned close to the rear seat 15 whereby the cushion 23 and the cushion of the rear seat will present a smooth surface. An auxiliary section 33 is provided with a base 34 which as illustrated in Figs. 1 and 3 is horizontally hinged as at 35 to an upright or partition 36. The auxiliary section 33 is adapted to be swung beneath the front seat 21 when the seats are not positioned for use as a bed. The end portions of the base 34 when it is not in use are supported by brackets 37 arranged below the front seat and on opposite sides of the body, the auxiliary section being thus prevented from moving pivotally in either direction by the seat 21 and the brackets 37 whereby it is carried without rattling. With reference to Fig. 1, it will be noted that the base 22 of the front seat snugly engages the top of the base 34 and is thereby braced by the same.

When the auxiliary section 33 is extended or is in an operative position, the base 34 of the same is engaged with a pair of longitudinally extending brackets 38 carried by the sides 12 and the adjacent portions of the front doors 13. The auxiliary section 33 when extended affords a spacious foot rest when the front and rear seats are positioned as a bed.

With reference to Fig. 3 in particular, it will be noted that the rear edge portion of the base 34 is provided with a groove 39 in which the forward longitudinal edge portion of the base 22 is received when the seats are positioned for use as a bed. The rear longitudinal edge portion of the base 22 is mounted on a transversely extending bracket 40 carried by the partition or upright 26. The longitudinal edges of the base 22 are in snug contact with the base members 24 and 34 and the front seat is therefore prevented from undue movement when the seats are extended.

Assuming that the seats are in the position illustrated in Fig. 1 and it is desired to position the seats for use as a bed the back 23 of the front seat is first swung to a horizontal position by releasing the springs 27. When the back is swung downwardly, the same is engaged with the brackets 32 and is retained in horizontal alinement with the rear seat 15. The front cushion or seat 21 is now removed to permit the auxiliary section 33 to be swung outwardly to a horizontal position. When the auxiliary section 33 has been engaged with the brackets 38, the front seat is again placed in position by seating the longitudinal edges of the same in the groove 39 and upon the bracket 40. The seats now afford a good bed and the transverse and longitudinal cushioning element 19 prevents the head from bumping the metallic sides of the body.

When it is desired to again use the seats, the front cushion 21 is first removed to permit the auxiliary section 33 to be swung to a horizontal position. The front cushion 21 is again placed upon the auxiliary section 33 and the back 23 is subsequently swung to an elevated position and is held in position by the springs 27.

With reference to the foregoing description and the accompanying drawings, it will be noted that a vehicle body constructed in accordance with this invention provides means whereby the front and rear seats of the same may be readily and conveniently converted into a sleeping bed or bunk.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed as new is:

1. A convertible vehicle body including a front seat having a hinged back and a removable cushion provided with a rigid backing, partitions traversing the body and forming a compartment below said seat, an auxiliary cushion having a yieldable side and a rigid backing hinged directly to the forward partition, brackets within said compartment for supporting the auxiliary backing in an inverted position beneath said first mentioned cushion whereby the yieldable side of the auxiliary cushion is entirely free when within the compartment, and means on the vehicle body immediately adjacent the forward partition to support the auxiliary cushion in advance of the first named cushion.

2. A convertible vehicle body including a front seat having a hinged back and a removable cushion provided with a rigid backing, partitions traversing the body and forming a compartment, an auxiliary cushion having a yieldable side and a rigid backing hinged to the upper end of the forward partition, brackets within said compartment for supporting the auxiliary backing in an inverted position beneath said first mentioned cushion whereby the yieldable side of the auxiliary cushion is entirely free when within the compartment, means to support the auxiliary cushion in advance of the first named cushion, and a bracket within said compartment for supporting the rear longitudinal edge of said removable first named cushion, said removable cushion resting directly on the rigid backing of the auxiliary cushion in normal position and having its front longitudinal edge supported by the auxiliary cushion when in extended relation.

3. A convertible vehicle body including a front seat having a hinged back and a removable cushion provided with a rigid backing, transverse partitions traversing the body and forming a compartment therewith, an auxiliary cushion having a yieldable side and a rigid backing hinged to the upper end of the forward partition, the said back being hinged at the upper edge of the rear partition, brackets within said compartment for normally supporting the auxiliary backing in an inverted position beneath said first mentioned cushion whereby the yieldable side of the auxiliary cushion is entirely free when within the compartment, means to support the auxiliary cushion in advance of the first named cushion, a bracket within said compartment for supporting one longitudinal edge of said first named cushion, and a rear seat having cushions coöperating with said first named cushions and said hinged back in forming a bed.

In testimony whereof I affix my signature.

EDWARD L. HAMILTON. [L. S.]